(12) United States Patent
Queveau et al.

(10) Patent No.: US 7,374,235 B2
(45) Date of Patent: May 20, 2008

(54) RETRACTABLE ROOF FOR A VEHICLE, WITH MOVABLE ARMS AND OPENING ROOF ELEMENTS

(75) Inventors: Paul Queveau, Montravers (FR); Gerard Queveau, Le Pin (FR); Jean-Marc Guillez, Cirieres (FR)

(73) Assignee: Heuliez, Cerizay Cedex (FR)

( * ) Notice: Subject to any disclaimer, the term of this patent is extended or adjusted under 35 U.S.C. 154(b) by 26 days.

(21) Appl. No.: 11/292,010

(22) Filed: Dec. 1, 2005

(65) Prior Publication Data

US 2006/0119141 A1 Jun. 8, 2006

(30) Foreign Application Priority Data

Dec. 1, 2004 (FR) ................................. 04 12772
Dec. 2, 2004 (FR) ................................. 04 12807

(51) Int. Cl.
*B60J 7/047* (2006.01)

(52) U.S. Cl. ............................. 296/220.01; 296/107.18

(58) Field of Classification Search ........... 296/216.05, 296/220.01, 107.18
See application file for complete search history.

(56) References Cited

U.S. PATENT DOCUMENTS

| 5,335,961 | A | * | 8/1994 | Reinsch et al. | ............. | 296/213 |
| 5,975,620 | A | * | 11/1999 | Jambor et al. | ............. | 296/108 |
| 6,648,397 | B2 | * | 11/2003 | Schutt et al. | .......... | 296/107.16 |
| 2001/0017478 | A1 | * | 8/2001 | Reinsch | ................. | 296/216.08 |
| 2002/0125743 | A1 | * | 9/2002 | Bohm et al. | ........... | 296/216.04 |

FOREIGN PATENT DOCUMENTS

| DE | 3903358 | 8/1990 |
| EP | 1331120 | 7/2003 |
| FR | 2836423 | 8/2003 |

* cited by examiner

*Primary Examiner*—Dennis H Pedder
(74) *Attorney, Agent, or Firm*—Winston & Strawn LLP; Richard P. Gilly

(57) ABSTRACT

The invention is a let-down roof structure with overlapping front roof panels and retractable side roof rails which pivot transversely into a stored position.

3 Claims, 8 Drawing Sheets

Figure 1:
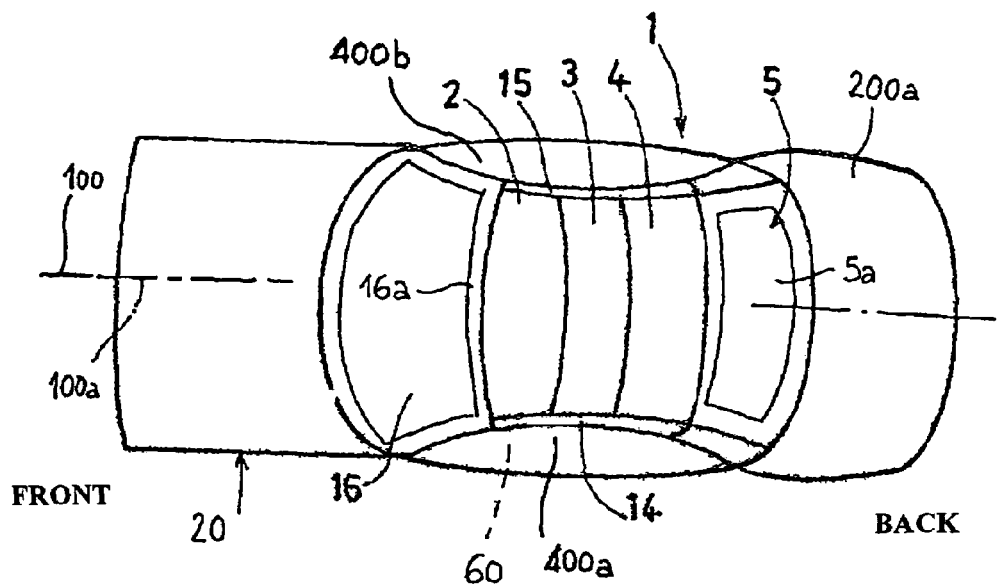

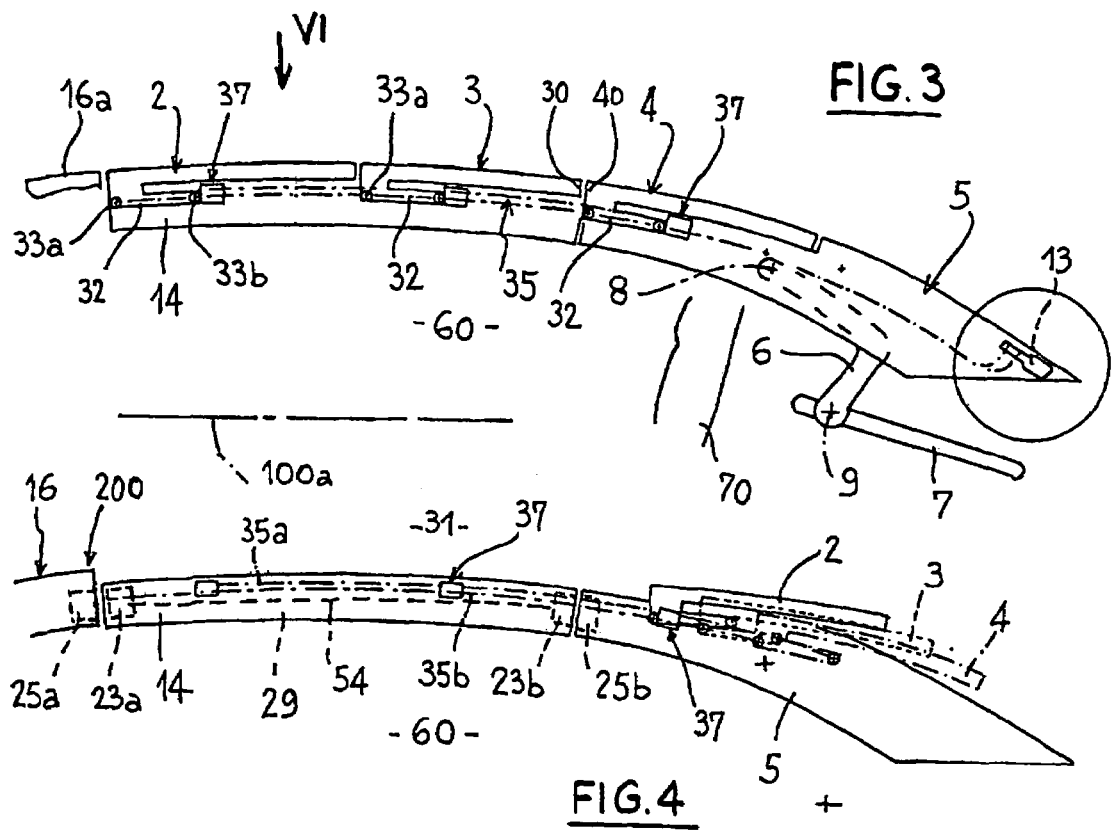
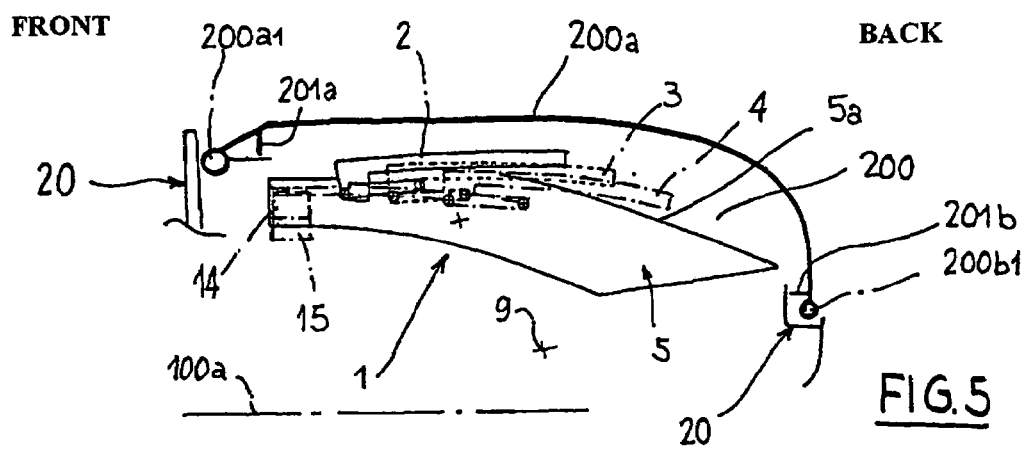

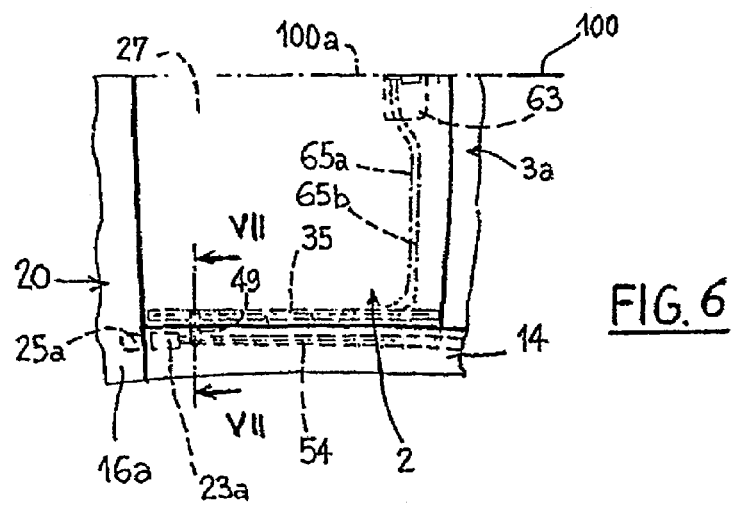
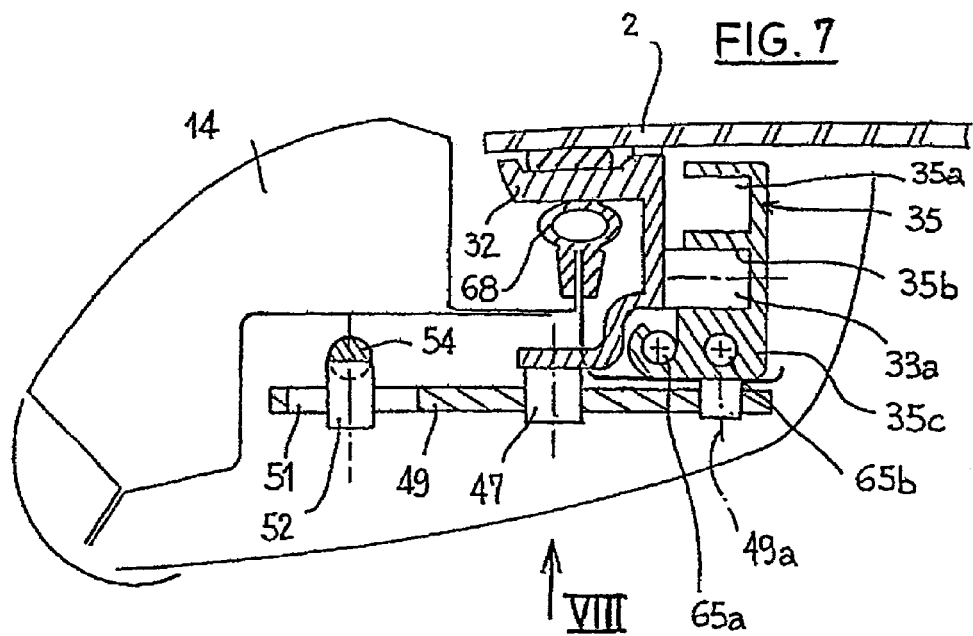

RETRACTABLE ROOF FOR A VEHICLE, WITH MOVABLE ARMS AND OPENING ROOF ELEMENTS

CROSS REFERENCE TO RELATED APPLICATION

This application claims priority to French Patent Application Nos. 0412772 filed Dec. 1, 2004 and 0412807 filed Dec. 2, 2004, which are incorporated herein by reference in their entirety.

The area covered by the invention is that of a retractable roof for a convertible vehicle, the vehicle itself, and a process for manoeuvring a movable roof on such a vehicle.

A retractable roof, or a movable roof, in the sense employed here, is used to convert a vehicle, of the two-seater coupe or four-seated saloon type, for example, into a vehicle of the convertible type, for example. An open pick-up or jeep could also be concerned, when the retractable roof would then be stored in the covering position, on the rear platform of the pick-up, for example, or in a vertical storage space located behind the seats or behind a separating partition to a luggage space.

In the area covered here, there exist retractable roofs that are thus fitted to, and disposed on, convertible vehicles and which include:

a first front roof element and a rear roof element which are each movable between a covering position in which they are above the passenger compartment and a storage position reached by movement of the said front and rear roof elements which are then stored in a storage space located apart from above the passenger compartment, and movable arms, fixed to the rear roof element and movable in relation thereto, between:

a first position in which they extend longitudinally between the rear element and a zone close to the windscreen, on either side and along the front roof element, thus laterally positioned between a top edge of the side windows and the first front roof element, and a second position in which said movable arms are retracted apart from the windscreen.

Such a retractable roof which typically includes front, intermediate and rear roof elements, respectively, is already known.

A problem arising here concerns the option for an occupant of the vehicle to be able to take advantage of the exterior environment, while the roof is in its aforementioned covering position.

An associated problem concerns the ability to ventilate the passenger compartment while limiting air turbulence in the latter.

Still another problem concerns the ability to increase the number of roof configuration options.

A solution proposed here, to all or part of the above problems, is to advise as follows:

at least one part of the first roof element is movable in relation to the rear roof element and to the movable arms, while:

the rear roof element is fixed in position on the vehicle, in its covering position, and the movable arms are in their first position, and, said at least one part of the front roof element is movable between:

a closed position isolating the passenger compartment from outside, and at least one open position in which a communication hatch between the passenger compartment and outside is created, there.

Regarding the movable arms, they are advantageously visible from outside (exterior of the vehicle) as side elements of the roof, when the roof is closed above the passenger compartment.

Advantageously, releasable locking means will perform a locking (and releasing) function for the movable arms, at least when they are in their first position. At the front, the releasable locking will be realised between these arms and the structural body (also called structural frame) of the vehicle, in said zone close to the windscreen, and at the rear, where appropriate, there will possibly be a link (such as said above-mentioned releasable locking) between the movable arms and the rear roof element.

For the mobility of said at least one part of the front roof element, moving means will advantageously be adapted to raise at least the rear of said at least one part of the front roof element, when it is displaced (rearwardly) to its open position.

It would be preferable that the movement means or means should be capable of raising said at least one part of the front roof element above the roof element located behind, when it moves to its open position.

Regarding the movable roof element, or element part, its mobility will preferably be more complete, for example, than a rotation around a fixed axis. It will consist advantageously of an overall displacement that is achieved through tilting by means of connecting rods, for example, or by linear displacement along slides.

In this regard, it is advisable, in order to render movable the opening panel of the front roof element by movement in relation to structural body and/or the lateral movable arms:

that the opening panel should be provided with front and rear sliders, that (several) series of superimposed lateral slides should extend between front and rear zones of the lateral movable arms, on either side of the longitudinal axis of the vehicle, and that tilting means should be provided locally on the series of slides, in order to move upwardly the rear and/or front sliders of the front roof element, toward another of said superimposed slides, when the front roof element is moved/displaced to the rear.

This therefore limits the risk of jamming between the opening roof element and an adjacent roof element and/or the arms and, if the level of the front or rear sliders is changed during the opening of this opening roof element, then the storage volume occupied by the stored roof elements will be optimised.

The following is also advisable:

the roof should include at least a second, intermediate, roof element (or panel), extending firstly between the first, front element and the rear roof element, in the covering position thereof, at least one part of the intermediate element should be movable in relation to the rear roof element and to the movable arms, while the rear roof element is fixed in position on the vehicle in its covering position, and this rear roof element and the said movable arms should be linked to the structural body by means of locking means for example, and said at least one part of the second roof element should be movable between a closed position isolating the passenger compartment from outside, and at least one open position in which a communication hatch between the passenger compartment and Outside is created, there.

In addition, the roof can include a third roof element (or panel), extending to the rear of the first or second roof element, and which is supported by the rear roof element.

The third roof element will be movable in relation to the rear roof element, while the rear roof element is fixed in position on the vehicle.

Further, the third roof element will be movable between a closed position isolating the passenger compartment from the exterior at the position of this third element and an open position, in which said communicating hatch between the passenger compartment and outside is created.

With the opening completed, by sliding to the rear, the front roof element can then operate only if the other panels (second or third) have been opened by sliding to the rear. These opening roof elements must further also have been opened so that the movable arms can be retracted and the passenger compartment completely uncovered, by tilting toward the storage zone of the rear roof element followed by the other roof elements.

Returning to the movable lateral arms, it can be seen that advantageously, in their second (retracted) position:
these arms will be retracted to the rear roof element to which they will then be immediately adjacent,
and preferably with the vehicle and the roof having a common plane of symmetry containing the longitudinal axis, the movable arms will be mounted to pivot on the rear roof element and will be folded crosswise in relation to the symmetry plane, in particular above one another.

It should also be noted that the present retractable roof can be substituted for a traditional retractable roof, that is to say in conformity with the first characteristics provided right at the start of the description, though without an opening movable roof element as indicated above.

Figure 2:
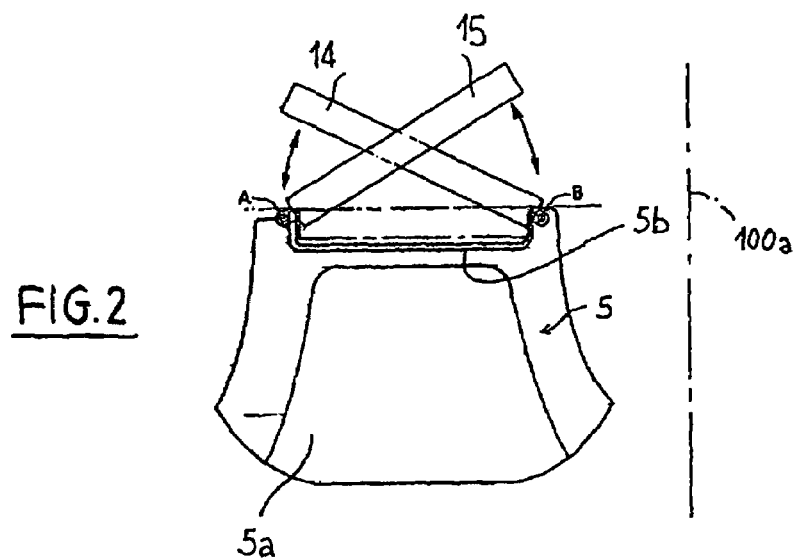
Figure 8:
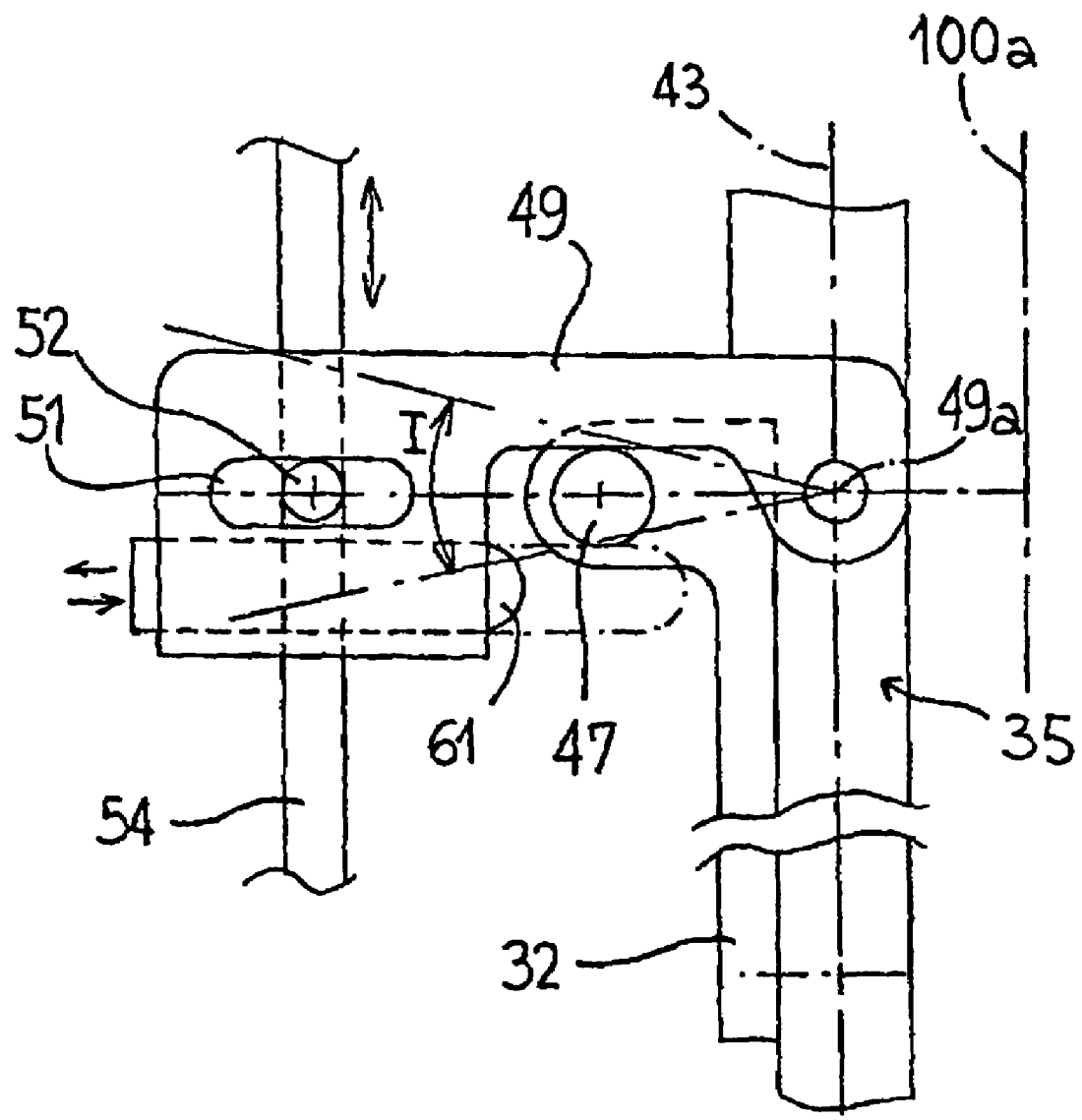
Figure 11:
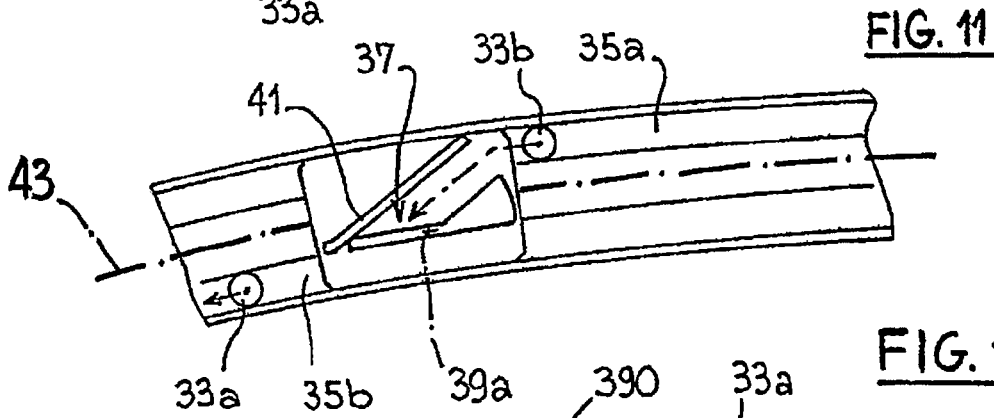
Figure 12:
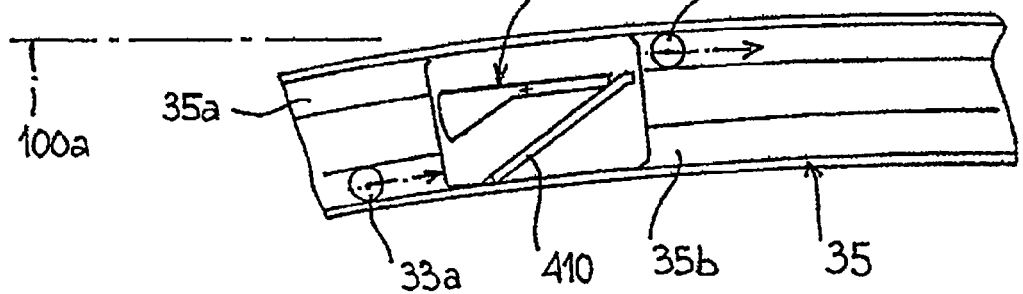
Figure 13:
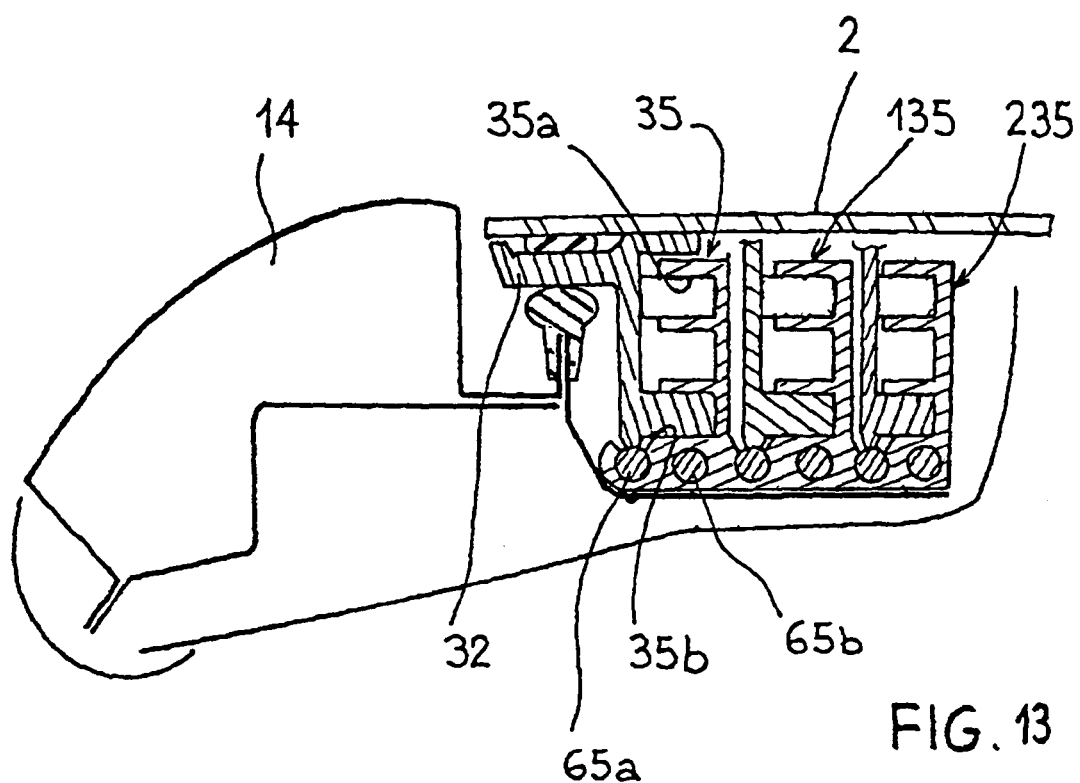
Figure 14:
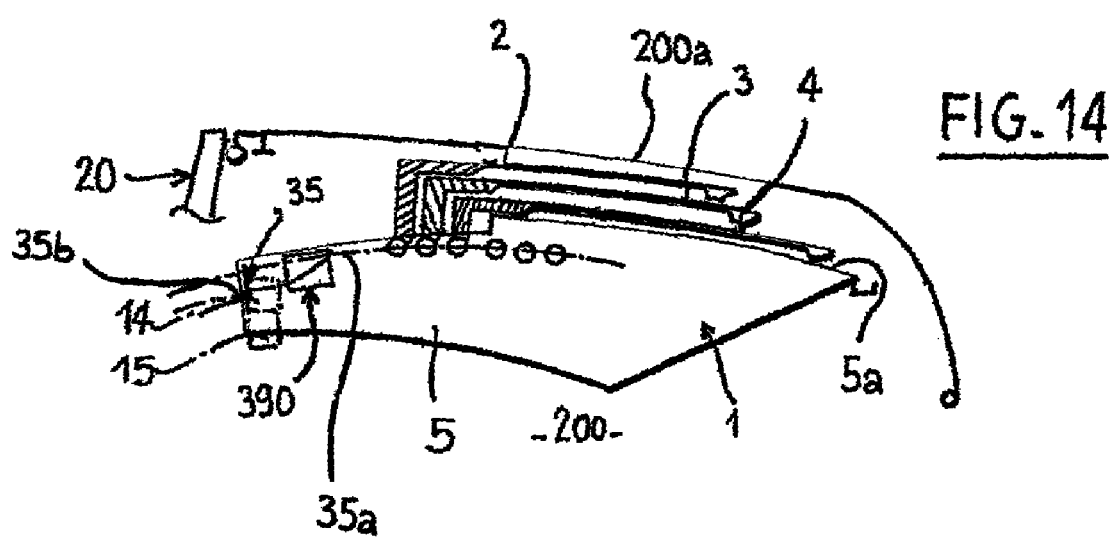
Figure 15:
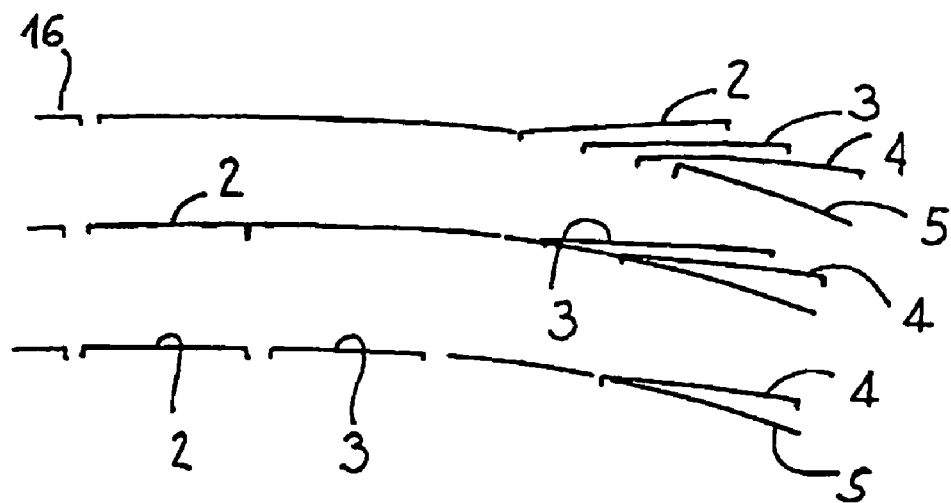
Figure 16:
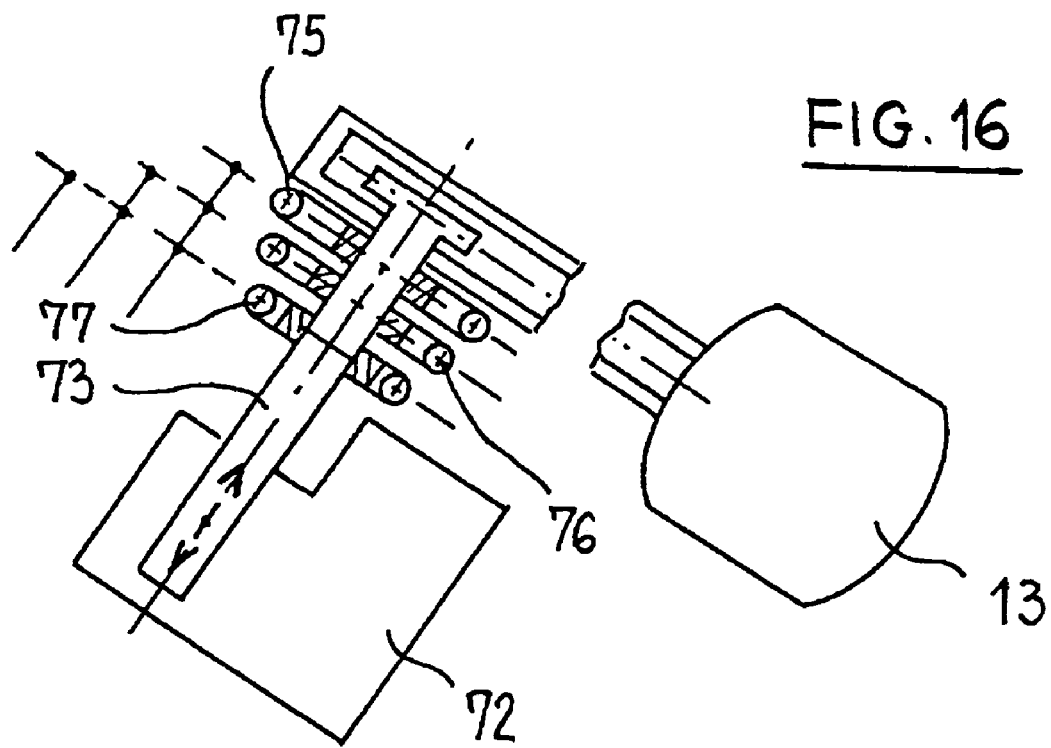

In the attached figures which illustrate this present description,

FIG. 1 shows, in plan view, a convertible vehicle which includes four rigid roof elements, here in the fully uncovered state of the passenger compartment, FIG. 2 shows the lateral arms in the process of pivoting, FIGS. 3 and 4 give a side view of the same roof as FIG. 1, respectively in the fully closed position and with its opening panels opened above the rear roof element, FIG. 5 is a schematic side view of the roof of FIG. 1, in one possible storage position, with the passenger compartment fully exposed, FIG. 6 presents, in plan view, a half view of the front roof element, on arrow VI of FIG. 3, FIG. 7 is the VII-VII section of FIG. 6, FIG. 8 is a view in the direction of arrow VIII of FIG. 7, FIGS. 9, 10, 11 and 12 show a section of superimposed slides, with a tilting system having four different positions, FIG. 13 is a section like FIG. 6 showing three slides for three opening roof elements, here side by side, FIG. 14 shows the roof of FIG. 1 in the storage position in the rear storage space, here in an alternative configuration to that of FIG. 5, and FIGS. 15 and 16 respectively show different opening configurations of the opening panels of a roof and a device for controlling these panels in linear motion, with selection of the panel or panels concerned, and adaptation of the speed of linear motion.

Since the vehicle described is symmetrical in relation to the median vertical plane of symmetry 100 which contains the longitudinal axis 100a, the present description is provided without distinction of the left and right sides of any part of the vehicle, such as the lateral edge, and this description can be completed by means of symmetry.

FIG. 1 presents, in schematic form, a convertible vehicle which includes a retractable roof 1.

This can be either a tilting roof or an oscillating-sliding roof, as appropriate.

Here it includes a front roof element 2, two intermediate roof elements 3, 4 and a rear roof element 5, with its rear window 5a, all movable or displaceable between a closed position in which they cover the passenger compartment 60 of the vehicle and a storage position in which they are stored inside the boot trunk 200. However the storage of the roof, with its roof elements closed up together as shown in FIG. 14, could be disposed at the position of another storage zone, such as just behind the seats 70 (the rear seats if there are several rows—see FIG. 3) or on the rear platform of a pick-up. Naturally, either single-bodied or double-bodied vehicles station wagons are also concerned here.

The lid 200a of the boot 200 preferably opens to the front and rear. Here it tilts on the structural body 20 of the vehicle, around a front axis 200a1 transverse to the longitudinal axis 100a, providing access to the luggage in the boot, and around a transverse rear axis 200b1, for storage of the roof 1, here in the boot. Known reversible locking means allow such a releasable locking at the location of or close to these axes 200a1, 200b1 (see latch 201a, 210b at the front and rear of the lid in FIG. 5 for example).

According to other embodiments, the roof can have no intermediate element, just one, or more than two. Moreover, the rear roof element can be unique as here or in particular can have a central rear roof element flanked by two lateral rear roof elements, in the covering position (roof closed).

Figure 9:
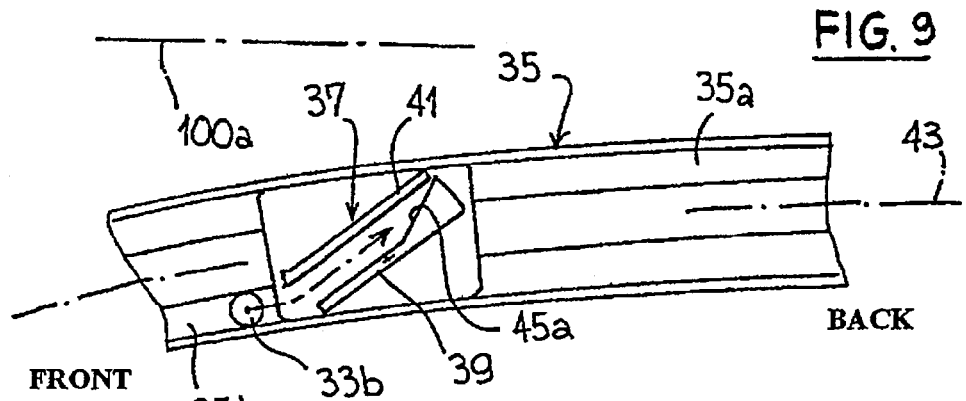

In FIG. 3, the rear element 5 includes a pivoting arm 6 engaged in a slide 7 extending inside the boot 200 and fixed to the structural body 20 (inner side wall of the body, for example). This arm could be a finger. In FIGS. 8 and 9, the arm pivots around perpendicular axes 100a.

The (motor-driven) arm 6 and the slide 7 guide and drive the movement of the rear element 5 between its open and stored positions.

The structural body 20 refers to the parts that define the structure of the vehicle and in particular the bodywork, the chassis, and the upright pillars.

The rear element 5 is also linked to the intermediate 3, 4 and front 2 elements by means of lateral retractable arms 14, 15.

In the closed position FIG. 1, the two movable arms 14, 15 here extend in the deployed active position along the lateral edges of the roof elements 2, 3, 4, between the front of the rear element 5 and the rear of the windscreen 16 of the vehicle (or more exactly the upper transverse element, or cross-member, 16a of the windscreen).

It therefore concerns side elements (or lateral parts) of the roof, then visible from the exterior of the vehicle. In this deployed active position, they are interposed between the upper edge of the side windows, like 400a and 400b of FIG. 1, and the other, more central, roof elements, such as 2, 3 and 4 in FIG. 1, then located in front of the rear roof element 5, longitudinally between it and the upper windscreen transverse element 16a.

These movable arms, supported by the rear roof element 5, are retractable apart from the windscreen and the other roof elements, for storage of the roof in its storage position, here shown as 200.

To this end they are retractable, for example, in a telescopic manner or by rotation, so as to be immediately close to the bottom and/or the front edge 5b of the rear element 5, in their retracted state (FIGS. 2, 5).

Here, the movable arms 14, 15 are each mounted to pivot on an axis of rotation A, B located on the front of the rear element 5. The axes of rotation A, B are not parallel, and here are approximately vertical and perpendicular to the axis 100a.

During the retraction of the roof, shown in FIGS. 2 and then 5, the two arms 14, 15 pivot around their axes of rotation A, B from a longitudinal position approximately parallel to axis 100a (the covering position of the roof, shown in FIGS. 1 and 3), to a transverse position (storage position of the roof, as in FIG. 5).

Since the rotation axes A, B are advantageously not parallel, the movement of the arms 14, 15 then occurs in two distinct planes so that the arms 14, 15 can be folded by overlapping or fitting in front of each other.

The arms 14, 15 are at least locked at the front, preferably to the top of the windscreen 16 using known locking means. These can be those of FR-A-2 851 750.

The same motor means 13 can be used to drive the arms and to perform the locking and unlocking of the roof.

In the covering position, the arms 14, 15 are therefore at least releasably locked to the windscreen 16 (body member 16a) using known releasable locking means. This locks the rear roof element 5 in the same position. Also, in this closed position, the roof elements 2, 3, 4, and 5 are disposed behind each other, with their transverse edges facing each other as shown by 30 and 40 in FIG. 3, being approximately edge to edge.

For the roof elements and/or the movable arms, the releasable locking solution of FR-A-2 820 692 or FR-A-2 851 750 could be applied here. FR-A-2 846 949 also illustrates a locking and roof mechanism that can be applied here and FR-A-2 851 744 describes a method of implementation that could be used to perform locking of the lateral movable arms.

In a known manner, the movement of the rear element 5 to the boot trunk leads to that of the intermediate element 4 onto the rear element 5, and of the intermediate 3 and front 2 elements respectively onto the intermediate elements 4 and 3.

In the storage position of FIG. 5, the roof elements are above each other, from top to bottom: 2, 3, 4, 5.

From FIG. 6 onwards, and from those associated, one arm structure will now be presented 14 for example, together with a fully opening roof element, 2 for example, while easily imagining the complementary half view by applying symmetry in relation to the vertical median plane 100.

In this embodiment, each element 2, 3, 4 can be opening and open if the roof element immediately behind is itself open.

FIGS. 3, 7 and 8 show that each opening roof element concerned, here the front element 2, can be fitted on either side with a trolley 32 fixed onto it. Each opening roof element made in this way is lockable in a releasable manner to the structural body 20 (directly or via the lateral arms and/or to the adjacent roof element).

Here, the lateral arms may be lockable only at the front, to body 16a, being supported at the rear by the rear roof element 5. Front/rear locking can be envisaged however, as shown in schematic form in FIG. 4, with additional front locking means 23a, 25a supported here by arms 14, cross member 16a, and additional rear locking means 23b and 25b, supported here by arms 14 and rear roof element 5, with coordinated drive provided by rod 54.

While in the illustrated closed position of FIG. 3, the roof elements 2, 3, 4, and 5 extend substantially in continuity with each other and behind each other, and in general along the longitudinal axis 100a (the solid line, with full covering of the passenger compartment). The opening elements 2, 3, 4 are shown in FIG. 4 in their open state in which they each create one opening, here a wide opening 29 for communication between the passenger compartment 6 and the exterior 31 of the vehicle. In FIG. 6, the opening of the single element 2 is shown as 27.

Regarding this opening element 2, it is movable/displaceable from front to rear, and vice versa, in relation to the arms 14, 15, which themselves are then locked to the structure, at the front, in a fixed position, and therefore extended in particular along the different elements 2, 3, 4.

For this movement, the illustrated trolley 32 should be provided with front sliders 33a and rear sliders 33b mounted to slide along a series of superimposed slides 35 which include a upper slide 35a and a lower slide 35b.

The slides extend in planes that are parallel to the symmetry plane 100.

Figure 10:
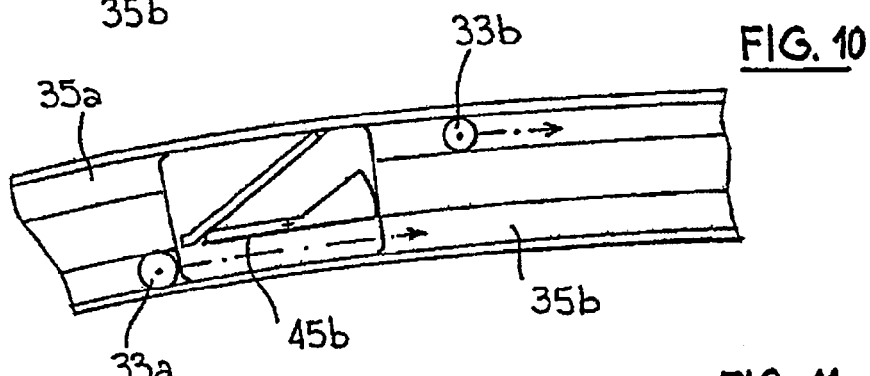

In FIGS. 9 to 11, tilting means 37 are used to change the slide level of the rear sliders 33b.

These tilting means include a rotating plate 39 with its axis of rotation perpendicular to longitudinal axis 100a, and a fixed inclined guide 41.

The rotating plate has an angulation on its upper face and a plane on the lower surface. It pivots around an axis 39a parallel to the longitudinal axis 100a.

The inclined guide 41 extends in a skewed manner in relation to the general direction 43 of extension of the slides 35a, 35b.

The tilting means 37 are located behind the rear sliders 33b when the opening element concerned is closed (see FIG. 3).

When, with the roof closed, the opening element is opened by moving element 5 to the rear, the rotating plate 39 is then inclined in the position shown in FIG. 9, because of the previous closure.

Because of this skewed position of the rotating plate, each rear slider 33b passes from the slide 35b (in which up to the present all of the sliders were engaged) to the upper slide 35a.

Passing to the rear inclined plane 45a of the rotating plate, which then extends across its path in the skewed pivoted state of this plate, the rear slider concerned replaces, horizontally, the lower surface 45b of the rotating plate (FIG. 10), so that the front slider 33a itself then passes under the rotating plate and therefore remains at the same level of elevation, and therefore in the lower slide 35b.

The opening roof element which then continues to move backwards, remains skewed from then onwards in relation to arms 14 and 15, and therefore at the approximately horizontal position that it occupied when closed.

In order to save space in particular, it is also possible, at the end of travel to the rear, to move in height the front of the roof element which is going backwards to the same level of elevation as the rear edge. FIG. 12, and in part FIG. 14, show that in order to achieve this, it is possible to provide, in another position of the slides, other tilting means 390 and an inclined plane 410 that are identical to the previous ones, but which are mounted the other way around, that is tilted by 180° around an axis parallel to axis 100a. In the direction of opening of the panel, it is then the front sliders 33a which rise, with the rear sliders, already more at the rear, remaining at the same level. When returning, during the closure of the panel, the said front sliders return to their original level with the roof closed (FIG. 3).

Returning to this closed position, the roof element 2 concerned here locks at the front at the end of its trajectory.

FIGS. 6 to 8 together show a simple and effective solution for this reversible locking, and here also for control of releasable latches 23a (even 23b). Here, each trolley 32 carries an end-stop 47 which pushes a lever 49 that is articulated crosswise to axes 100a and 43, around an approximately vertical pivoting axis 49a fixed to the series of slides concerned, shown as 35 in this case. Lever 49 extends under this series of slides (FIG. 7).

At its free end, the lever 49 has an oblong orifice 51 that accommodates a finger 52 for transmission of movement to a rod or a cable 54 to control the said reversible locking means 23a or 23b.

A security finger 61, controlled electrically for example from the control panel for the passenger compartment, also preferably blocks the end-stop 47 against the surface of the lever 49, in the closed locked state of the roof element 2 concerned here.

Thus, advantageously for their opening and closing manoeuvres, with arms active and preferably locked (FIGS. 3 and 4), each opening element of the roof will include reversible locking means (here indirect) in relation to the so-called movable arms and/or the structure 20 which will be independent, at least functionally, of the reversible locking means that are provided for these arms. As a result, it is possible to keep the arms 14, 15 locked at least at the front, and to open and close the opening elements at will.

The swing angle I in FIG. 8 allows locking or unlocking of the arm 14 at front or back in relation to the structure 20 and/or of the rear roof element, while still locking or releasing the element 2.

It would be preferable that the sliding of roof element 2 along axis 43 should be driven by means of an electric motor 63 attached to it.

The motor 63 controls the trolleys 32 by means of traction means, with pushing or rotation accomplished using rods (preferably articulating) or flexible cables, such as those shown as 65a and 65b in FIGS. 7 and 12.

These transmission means, such as cables 65a and 65b, will pass advantageously into the core of the slide structures, here in a part 35c located under the sliding zones of slides 35a and 35b.

In FIG. 3, roof elements 2, 3 and 4, then closed, follow the curvature of their lateral arm 14, to which the series of slides 35 is fixed laterally.

In FIG. 7, roof element 2 slides over joint 68 (approximately), against which the trolley is carried or slides 32.

FIG. 13 shows a solution with three slides 35, 135, 235, double like 35a and 35b and side by side, for three front and intermediate opening roof elements (such as 2, 3 and 4; with only element 2 shown here).

Here, the three slides are of the single-block type. They could be moved advantageously, in particular to follow the different curvatures, and/or be shifted in height.

Regarding FIG. 14, as an alternative to FIG. 5 this shows the roof 1 stored in the boot 200. The rear roof element 5 is approximately horizontal, covered in succession by elements 4, 3, and 2, which themselves are approximately horizontal and with a placement and a curvature that is approximately parallel to that, above 5a, of the rear roof element 5. In order to reach this position, use has been made here, in addition to the tilting means 37, of those 390 of FIG. 12, when the sliders are then all disposed on the same slide level 35.

In FIGS. 14 and 5, the opening roof elements 2, 3, 4 are all in their open state, moved to the rear and above the marked surface 5a of the rear element 5. The lateral arms 14, 15 are then in their retracted state, here folded crosswise to axis 100a, below element 5. The opening roof made in this way therefore includes different position options, and it is possible to create one or more roof elements through the use of a window.

In addition to its releasable and indirect locking mentioned above, using lateral arms 14 and 15, the rear roof element could be directly locked, in particular at the rear, to a part of the structure 200, in a fixed, closed position as shown in FIGS. 1, 3 and 4, by at least one independent releasable latch.

From an open state of the roof, to its stored position as shown in FIG. 5, its closure is accomplished as follows:

Typically by tilting and here also by sliding, the rear element 5 is brought above the rear of the passenger compartment 60. These lateral arms 14, 15 are deployed to the front, as can be visualised from FIG. 2. The opening elements of the roof 2, 3, 4 are still in the rear moved-back position. The situation of FIG. 4 then applies, with a wide opening 29 cleared between the lateral arms 14, 15, the upper cross member of the windscreen 16 at the front, and the roof element 5 at the rear. If dependent locking means for the arms 14, 15 are supported by the latter, at least at the front, it is then possible to proceed to locking of the said arms to the structural body 2, in the immediate proximity of the top part of the windscreen. Otherwise, the arms are not yet locked at the front, even though they are extended into their active position.

In this last hypothesis, it is then preferable to provide automatic closure control for the opening elements concerned, here 2, 3 and 4, by movement in the direction of the windscreen 16.

In a solution with slides (such as 35), which here is particularly recommended, elements 2, 3 and 4 slide together or in succession until they are located behind each other, in continuity as shown in FIG. 3, preferably passing on the aforementioned tilting means 39, even 390, so as to again drop approximately to the level of the arms, at least as far as their rear part is concerned.

If, as in the above solution of FIGS. 7 and 8 in particular, it is the final front end-stop of the front roof element that locks the lateral arms 14, 15, then this end-stop of the trolley of the front roof element 2 causes each lever 49 to pivot, and thus controls the locking of at least the front locking means 23a which then engages their additional means 25a. This then is the fully closed and locked solution (both of the lateral arms and of the roof opening elements) of FIG. 3. The rear element 5 is then also naturally in its covering position.

To open at least the front roof element 2 (same remark for the intermediate roof elements 3 and 4 if any), an independent locking means will then be unlocked with advantage, (such as security latch 61 of FIG. 8), for example, which then allows the trolleys 32 of this roof element to be moved backwards, without resulting in unlocking of the lateral arms 14, 15. In the solution represented in FIGS. 3 and 4, for a complete withdrawal of the front roof element 2, it will be necessary to first have at least partially moved back the roof element(s) located behind it.

In order to fully store the roof and return back to the situation of FIG. 5, the action will be the reverse of what has been described above.

This means that starting from the totally closed situation of FIG. 3 for example, one moves from the situation of FIG. 4, with the roof elements 2, 3 and 4 opened and brought partially above each other and above the rear element 5, still in the covering position, with the arms 14 and 15 active and deployed longitudinally up to the windscreen body (and preferably still locked to it), and we then execute a sequence of retraction operations that are the reverse of the previous description, until the roof has been re-positioned at the intended position of its storage zone.

FIG. 15 shows that, in the covering position of element 5, only the third panel 4 (illustration at the bottom), the second and third panels 3, 4 (middle) or the first, second and third panels 2, 3, 4 (top) can be opened.

To control these, the use of a motor 13 is recommended. In FIG. 16, this is coupled to a selector 72 which controls a shaft or selection dog 73 which, depending on its axial position (see double arrow), enables one to choose to drive one, two or three panels 4, 3, 4 or 2, 3, 4 as shown in FIG. 15. Pins 75, 76, 77 of different sizes, depending on the position of the panels and therefore of their trajectories when opening or closing, perform transmission of the movement on the axial position of the selection dog.

The longer the trajectory of the panel, the greater will be its speed of linear motion (large pin 75). The small pin 77 will be for panel 4.

Regarding the process for manoeuvring the movable roof as mentioned above, in a situation aiming to close the roof from its open storage position, in which the said roof elements are located together away from overhead the passenger compartment 60, a)—the front 2, 3, 4 and rear 5 roof elements are moved from their open position to a position covering the passenger compartment, in which they are therefore positioned above this passenger compartment with the front roof element 2 in front of the rear roof element, and b)—the front roof element, or at least a first part of it, is fully locked to an adjacent roof element 3, 4 such as the rear roof element 5, and/or to the structural body 20, directly or indirectly, with the rear roof element remaining in its covering position, and then, from this stage b, creating the desired communicating hatch between the passenger compartment and the exterior of the vehicle at the position at least of the front roof element:

c)—either all of the front roof element is unlocked in relation to the adjacent roof element and/or the structural body, directly or indirectly (via arms 14 and 15), or this applies at least to the said first part of this front roof element in relation to a second part of this front roof element 2, d)—in relation to the rear roof element 5 still in its covering position, the unlocked front roof element 2, or its said first part, itself unlocked, is moved so as to pass from a closed state of the front roof element isolating the passenger compartment 60 from the exterior at the position of this front roof element to an open state revealing the said communicating hatch 27, 29.

Preferably and as already indicated, the front roof element 2, or its said first part, is moved by displacing it in direction of the rear roof element 5. To this end, and in the light of the above, it is naturally advisable, while the rear roof element 5 is still in its covering position, to cause the front roof element 2, or its said unlocked first part, to move along the said slides 35.

It is again envisaged that, by means of the tilting means systems already presented, firstly a rear edge of the front roof element 2, or of its said first part, should be shifted in relation to a front edge of the rear roof element, and that a tilt will be maintained in this front roof element, or its said first part, during its movement to the rear roof element 5.

It can be seen that in such a manoeuvring process, the said first and second parts of the opening roof element concerned will advantageously be a movable roof panel and a support structure for this panel respectively, and in particular a support body accepting the said movable panel when it is closed. Under the roof panel will then be fixed the trolleys 32 whose arrival at the end-stop, as shown in FIG. 8, will control the locking of the panel and of the support body.

The views in FIGS. 7 and 8 will then be applied in an identical manner, with the lateral arms (such as 14) becoming, as illustrated in FIG. 7, the support body which will therefore be able to lock in a releasable fashion at the front to the top windscreen body 16a (since it is assumed here that reference is made to front roof element 2) and, at the rear to the support body of the adjacent roof element or to the rear roof element 5 (if there are only two roof elements 2 and 5).

FIGS. 9 to 12 can also apply in identical manner to the sliding movement of the opening panel concerned. Same remark for FIGS. 13 and 14.

The invention claimed is:

1. A retractable roof fitted to and disposed on a convertible vehicle having a longitudinal direction and including a passenger compartment, a structural body, side windows and a windscreen, said roof including:

a movable first roof element and a movable second roof element which are each movable between:

a covering position in which they are above the passenger compartment, so that the first roof element can be moved, in said longitudinal direction, along superimposed slides by means of front sliders and rear sliders, between a frontward position, in front of the second roof element, and a rearward position, above the second roof element, said superimposed slides being provided with level changing means for having a level of elevation of the first roof element changed, and while said first roof element is sliding rearward, only the rear sliders have their level of elevation in said superimposed slides changed, and, a storage position in which they are stored in a storage space located apart from above the passenger compartment, with said first roof element above the second roof element, movable arms, fixed to the second roof element and movable in relation thereto, between:

a first position in which they extend longitudinally between the second roof element and a zone close to the windscreen, on either side and along the front first roof element, and a second position in which said movable arms are retracted apart from the windscreen.

2. A retractable roof fitted to and disposed on a convertible vehicle having a longitudinal direction and including a passenger compartment, a structural body, side windows and a windscreen, said roof including:

a movable first roof element and a movable second roof element which are each movable between:

a covering position in which they are above the passenger compartment, so that the first roof element can be moved, in said longitudinal direction, along superimposed slides, between a frontward position, in front of the second roof element, and a rearward position, above the second roof element, said superimposed slides being provided with level changing means including tilting means which tilt for having a level of elevation of the first roof element changed, and, a storage position in which they are stored in a storage space located apart from above the passenger compartment, with said first roof element above the second roof element, movable arms, fixed to the second roof element, on which said level changing means are disposed, and which are movable in relation to said second roof element, between:

a first position in which they extend longitudinally between the second roof element and a zone close to the windscreen, on either side and along the front first roof element, and a second position in which said movable arms are retracted apart from the windscreen.

3. The retractable roof according to claim 2, wherein each tilting means includes a rotating plate.

* * * * *